Aug. 8, 1950

M. D. McFARLANE 2,517,797

FILM FACSIMILE SCANNING

Filed April 12, 1946

2 Sheets-Sheet 1

INVENTOR:

Maynard D. McFarlane

Aug. 8, 1950 M. D. McFARLANE 2,517,797

FILM FACSIMILE SCANNING

Filed April 12, 1946 2 Sheets-Sheet 2

INVENTOR:

Maynard D. McFarlane

Patented Aug. 8, 1950 2,517,797

UNITED STATES PATENT OFFICE 2,517,797

FILM FACSIMILE SCANNING

Maynard D. McFarlane, Los Angeles, Calif.

Application April 12, 1946, Serial No. 661,573

4 Claims. (Cl. 178—6.7)

This invention relates to improvements in film facsimile scanning, that is, to scanning methods and means particularly adapted to the transmission of motion picture film by facsimile, such as by a point-to-point facsimile system. The method of transmission may be by radio or by wire line, and the invention is applicable to these and other communication systems.

The transmission of motion picture film by facsimile has been accomplished in the past by transmitting sections of motion picture film with conventional apparatus by wrapping the film around a drum, or by special equipment designed for scanning film. Usually in these latter systems the film is advanced continuously past the point of scansion at a uniform rate while being scanned in a direction transverse to its movement. My invention will be described in reference to a system of this latter type, although the invention is not limited to the particular type of mechanism described and illustrated.

Examination of a strip of motion picture film shows that there is often only a slight change of picture content between adjacent frames, and that therefore in the transmission of each frame in sequence, a considerable portion of the transmission time is used in repeating identical picture information. An analysis of a large number of films of the type for which facsimile transmission might be usefully employed shows that the image shift representing movement is comparatively small from frame to frame under average conditions.

An object of my invention, therefore, is to economize on the time of transmission of a motion picture facsimile by utilizing certain portions of a frame already transmitted in the reproduction of a succeeding frame. The proportion of the area of repetition depends upon the subject matter: full scale projection tests have shown that a repetition of half the area is quite acceptable to an ordinary viewing audience, and under certain conditions a higher proportion is permissible. In the following description of my invention the transmission of one-half of the area will be illustrated, as this affords a useful compromise between complete faithfulness of transmission and economy of line time: it is to be understood, however, that the invention is not limited to this proportion of repeated area, and that the same principles may be used for the transmission of one-third, one-quarter, or any other desired fraction of the area.

In a preferred embodiment of my invention illustrated below I scan the original film in such a manner as to transmit alternate lines of a predetermined scanning pattern and to reproduce a received film built up from repetitions of the scanning pattern in each frame. For example, suppose frames numbered 1, 2, 3 and 4 are to be transmitted—alternate lines of each frame are sent, and the final projected film at the receiving station is made up, in respect to the first frame, of the transmitted portions of frames 1 and 2, in regard to the second frame, of the transmitted portions of 2 and 3, in regard to the third frame of the transmitted portions of 3 and 4, and so forth. An object of my invention is therefore to secure this result.

Since the transmitted portions of alternate frames are to be added to make the final composite film, it is clear that in each alternate frame different portions of the picture must be scanned, so that the sum will represent the whole picture: according to one form of my invention this may be accomplished by scanning adjacent area or lines of scansion in each adjacent frame. An object of my invention is therefore to secure this result, and one way in which it may be accomplished is (by reference to a frame divided into its full number of lines of resolution for complete scansion) to secure partial or one-half area scansion by scanning the odd-numbered lines in the first frame and the even numbered lines in the second frame, and so on for the length of the film to be transmitted.

In this way the scanning might be compared to a television interlace scan, except that the second half of the interlace is taken from an adjoining frame instead of from the same frame. And, where it becomes desirable to do so, the invention may be applied to a television interlace of adjoining frames: an object therefore of my invention is to secure an alternate frame interlace scanning pattern.

A further object of my invention is to secure additive results from the one-half transmissions, and this may be accomplished by circuit elements or by methods of film processing. As is illustrated below, a composite result can be obtained for projection by a multiple printing method and by multiple exposure methods, and these are included among the objects of my invention.

A multiple printing method may comprise producing a printing negative which includes the transmitted portions of each frame in proper spatial disposition and a mask, which may conveniently be a part of the same film, the mask serving to protect from exposure the spaces between the scanned (and recorded) lines. Since the scanned lines are staggered (or of an interlace pattern) the mask lines must be similarly disposed. The preparation of either a master negative or a print for projection then consists of printing the film once in the normal manner, and then a second time displaced by one frame interval. The result is that in the first printing the mask has saved unexposed alternate lines (not scanned), and in the second printing these lines are printed with the picture from the adjacent frame while the mask has prevented fogging of the parts already printed.

A combination of mask and recorded picture may be prepared by a simultaneous exposure (sufficient to develop to a dense black) of alternate lines while the picture is being recorded, or it may be prepared photographically from a received film bearing only the recorded picture composed of alternate scanned lines with clear spaces between the lines. It is not essential that the mask should be integral with the recorded picture, though that method of handling the process has many advantages in maintaining register in spite of film shrinkage, preventing mistakes in mask adjustment or in mask size, etc. Where a separate mask is used it may be on film run through the printer with the negative and positive, or it may be a mask in the printer aperture displaced the proper amount to secure alternate frame register, or it may take other forms. In the modifications discussed below a combination picture film and mask is shown, but my invention is not limited to this form of masking.

In the drawings no method of synchronizing or of phasing is shown, as these devices are known in the art, and my invention is independent of the methods used to achieve these results. Also, in order to secure the alternate-line scanning of alternate frames above described it is necessary that there exist a predetermined ratio between the transverse and longitudinal scanning to secure this result: since in standard motion picture film each frame interval is .75 inch, it follows that the scanning line spacing shall not be divisible into a .75 inch but shall be divisible into 1.5 inches. In other words, each frame interval will have a certain number of lines and a half line. Similarly, for transmission of only one-third of the picture area the frame interval may be scanned by a system comprising a number of lines and one third (or two thirds), and the final print may be made by three printings, normal, displaced one frame, and displaced two frames: a similar arrangement is possible with four or more frames. The mechanical gearing to accomplish this is not shown in detail, as a number of arrangements which may be adopted so as to obtain this result are known. And it is clear that the scanning and printing unit need not be a single frame interval, but may be an integral number of frames if desired, although this introduces a possible objectionable misplacement of picture matter due to the time element involved in the use of more than one frame.

Also the method used for transverse scanning is not illustrated in detail, as several methods are known to the art for accomplishing the desired result. For example, this transverse scanning may be effected by a rotating polygonal reflector, geared to produce the proper scanning as above described, or the scanner may take the form of an oscillograph mirror, the oscillograph being actuated by suitably varying currents so controlled as to secure the desired relationship between the horizontal and vertical scansion, or it may be a prism having the required motion (such as a rotating square prism with the light beam passed therethrough), or it may be a cathode ray tube suitably controlled, or it may take any other suitable form. It is therefore to be understood that my invention is not limited to any one form of mechanism, but may be used with any suitable scanner adapted to produce the desired scanning pattern and controlled by any suitable synchronizing and phasing method.

In the specification and appended drawings I have described and shown certain preferred forms of my invention by way of illustration; the invention is not circumscribed by the particular embodiment shown. In the drawings.

Figure 1:
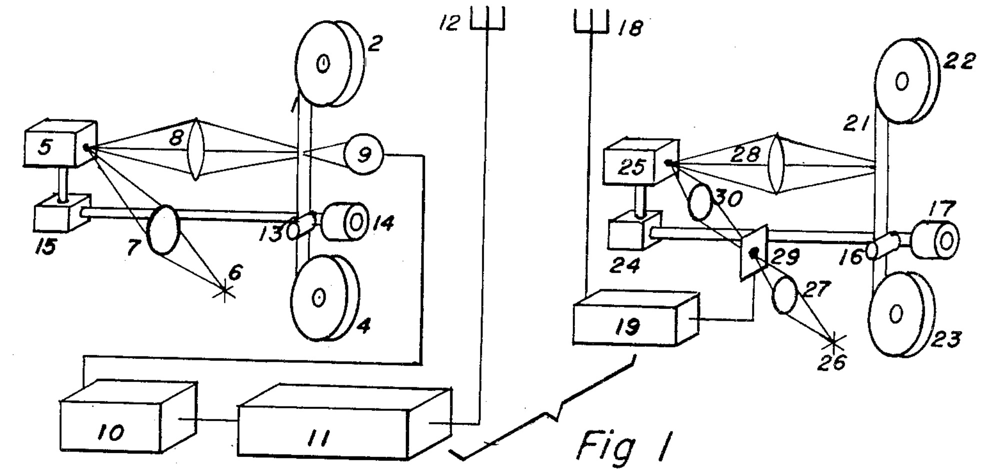
Figure 1 is a schematic diagram of a film facsimile system according to my invention.

In Figure 1 a schematic representation is given of a facsimile system arranged for the transmission of motion picture film. The transmitter is shown at the left, where the film 1 is shown being fed from the reel 2 to the reel 4, passing the scanning spot en route. The mechanical film drive may be by means of the sprocket 13 and the motor 14, arranged so as to feed the film continuously forward at a predetermined constant speed. Transverse scanning of the film may be by any appropriate means, and is here shown as effected by the unit 5 which serves to traverse a reflected light beam over the surface of the moving film, the unit 5 being operated by a drive from the motor 14 through the gear box 15. The light beam may be obtained from the source 6, concentrated on the reflecting element by the lens 7, and focussed on the film by the lens 8 (which may be of any suitable type, such as a spherical or cylindrical lens). After passing through the film and being thereby modulated in intensity by the tone shadings of individual areas of the film, the light impinges on the photoelectric cell 9, where the energy is translated into an electrical current. This current is passed to an amplifier 10, and thence serves to modulate the output of the radio transmitter 11 in any suitable desired manner. The energy radiated from the antenna 12 thus conveys the facsimile intelligence secured as a result of the scansion of the film 1 by the combination of its forward movement and the transverse movement of the scanning beam.

While this embodiment of the invention shows the facsimile signal as employed to modulate a radio transmitter, it is clear that the invention is not limited to radio transmission, and that the radiation elements here shown may be replaced by any other suitable communication channel, such as a wire line or a co-axial cable, as may be desired.

A portion of the energy radiated by the antenna 12 at the transmitter is picked up by the receiving antenna 18 and is applied to the radio receiver 19. The output of the receiver 19, in suitable form, is applied to the light valve 29 which is so disposed in the receiving optical system as to modulate the light from the source 26 in a manner corresponding to the modulation of the light intensities at the transmitter by the tone gradations of the film. The light from the source 26 may therefore be concentrated on the light valve 29 by the lens 27, and the modulated beam then may be concentrated on the scanning reflector 25 by the lens 30. This scanning reflector 25 may be the same type as the unit 5, or it may be of any other suitable type for traversing the beam across the film 21 after passage through the lens 28 if desired. The film 21 is fed from the reel 22 to the reel 23 by means of the sprocket 16 and motor 17, which are so arranged as to feed the film 21 at the same rate of speed as the film 1 is advanced at the transmitter. And the unit 25 is correlated with the film drive to secure identical scanning of the film 21 to the scanning of the film 1 by the unit 5, and the scanning motion of the unit 25 is phased with the motion of the unit 5. The unit 25 may conveniently be operated from the motor 17 through the gearbox 24.

As described above, the units 5 and 25 are geared to their respective film drives, or they may be otherwise controlled thereby, so as to produce a scansion of an integral number of scanning lines plus a half line per frame interval of film. The term frame interval does not mean the area bounded by a particular set of frame lines, but the distance along the direction of travel of the film equal to that between identical points on successive pictures; conveniently this may be taken as the distance between the top of one frame and the top of the succeeding frame. With Academy standard sound motion picture apertures, the portion enclosed by the frame lines is less (by some 20 percent) than the frame interval, the distance between the top of one frame and the top of the adjacent frame.

A method of determining the gear ratio is as follows: assuming that the film drive is by a standard 16 tooth film sprocket; and that the traverse scanning unit is a 12 sided reflector, and than 100½ lines of transverse scanning are required per frame interval each line being .00375″ wide (equivalent to an effective resolution of 201 lines), the ratio between the sprocket shaft and the reflector shaft is $$1:\frac{4\times 201}{12\times 2} \text{ or } 2:67$$

While in this figure a fixed light source and light valve have been shown as a means of producing the desired modulated light intensities, it is obvious that my invention is not limited to this arrangement of elements, and that any suitable means for producing light of intensity corresponding to the received signals may be used, as for example a glow discharge lamp (McFarlan Moore), or a Kerr cell, or a cathode ray tube.

Figure 2:
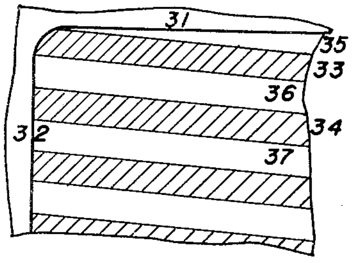
Figure 2 is an enlarged view of the scanning on a portion of one frame of film.
Figure 3:
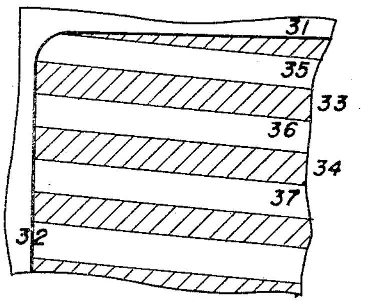
Figure 3 is a similar representation of a succeeding frame of film.

Figure 2 shows an enlargement of the upper left hand corner of a frame of film scanned according to this invention. The frame lines 31 and 32 denote the frame boundaries, and the lines of scansion are shown cross-hatched at 33 and 34, with spaces equal to the width of the scanning lines at 35, 36 and 37. In Figure 3, which is a similar part of an adjacent frame, it will be noted that the scanning structure is such that there are lines of scansion in this Figure 3 where there are spaces in Figure 2, and vice versa. It can be seen that superposition of Figure 3 in register (by frame lines) on Figure 2 will result in complete fill-in of the spaces, and thus provide complete coverage of the picture area. This is the effect obtained by the double printing process described below.

Figure 4:
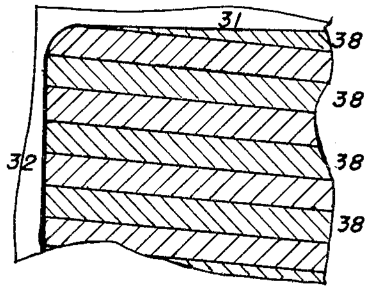
Figure 4 illustrates a portion of one frame of a combined picture and mask.
Figure 5:
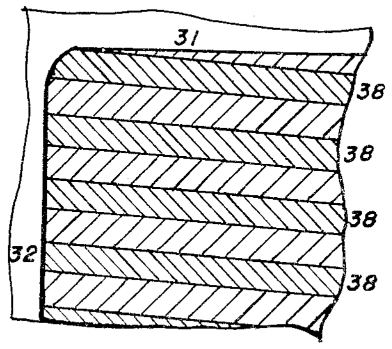
Figure 5 is a view of a corresponding portion of an adjoining frame of a combined picture and mask.

Figure 4 and Figure 5 show a similar pair of adjacent frames scanned in alternate lines, with the areas 38 between the lines of scansion rendered opaque. Film as shown here may be prepared from that of Figures 2 and 3 by printing, or from the recording system shown in Figure 10. Figures 4 and 5 thus represent the combined picture-and-mask above mentioned, and the film that they represent may be used for preparing a composite film by double printing in which the first print records the alternate lines while the opaque areas, prevent exposure of the intermediate lines, and in a second printing in which the frame register between the negative and print is shifted one frame interval, the blank portions of the print are exposed while the opaque areas prevent fogging of the portions already exposed.

Figure 6:
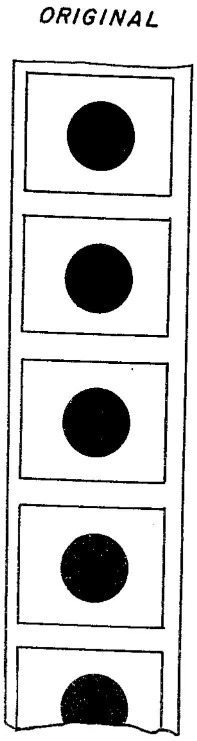
Figure 6 represents the scanning of a succession of frame intervals of film.
Figure 7:
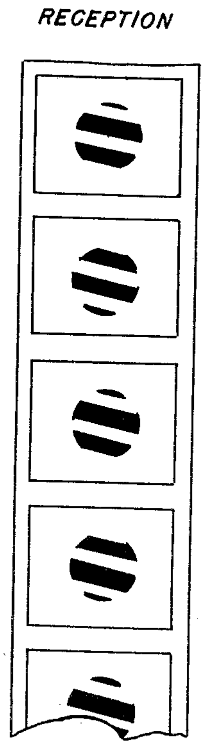
Figure 7 represents the reception in one form of the film of Figure 6.
Figure 8:
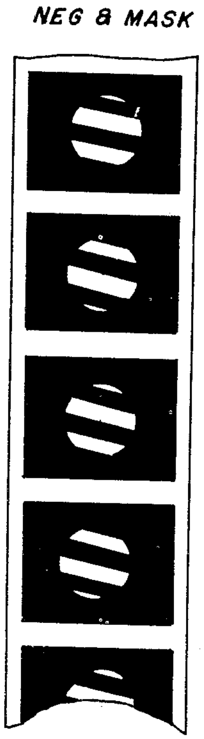
Figure 8 represents the reception in another form, and a combined mask and picture film.
Figure 9:
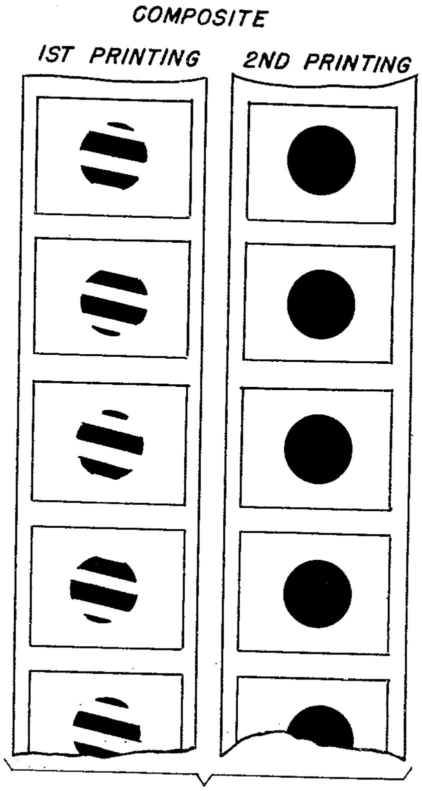
Figure 9 represents the two stages in the printing of a composite film from the film shown in Figure 8.

Figures 6, 7, 8 and 9 show the various states of the process of transmitting a motion picture film according to the invention. The film shown in Figure 6 is the original film to be transmitted: Figure 7 illustrates the film received by recording alternate lines as above described: Figure 8 shows the combined mask negative for making the double-exposure prints (note that with the device illustrated in Figure 10 the received film may take the form shown in Figure 8 rather than that of Figure 7): and Figure 9 shows the film in its two stages of exposure, the image on the film shown at the left of Figure 9 being however a latent image so that in an actual finished composite process the step at the left of Figure 9 is not visible.

In order that the various steps in the process may be readily understood the film in Figure 6 is shown as bearing a black circular image on a white background. In practice all shadings from black to white may be present, and are handled by the process. Also, to make the illustration clear, only a few scanning lines covering the frame are shown instead of the large number which would exist in practice (200 to 1000 lines per frame), and for clarity, sound track, film perforations etc. have been omitted from the drawings. In this example it is assumed that the sending copy is a positive print, and therefore the final result in Figure 9 is also shown as a positive. If the film in Figure 9 is required for use in preparing distribution prints and is required to be a negative, the sending original may be a negative, or the circuit connections may be so arranged as to produce a reversal of tone during transmission, or a positive picture of the style shown in Figure 7 may be produced with the negative mask of Figure 8, or an additional printing step may be introduced. It is thus seen that flexibility may be secured without departure from the spirit of my invention.

Figure 10:
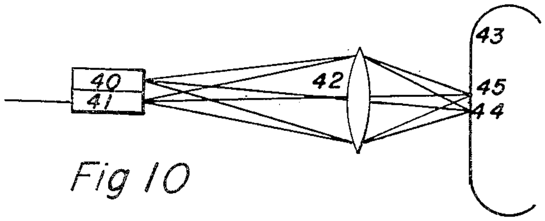
Figure 10 is a schematic of a system for producing the film shown in Figure 8.

In Figure 10 is shown a mechanism for producing a film of the type shown in Figure 8 directly from the received facsimile signals. In the particular modification diagrammatically illustrated here, the light value used is divided into two portions, an upper part 40 having a fixed aperture capable of producing an image on the film of the size of an elemental unit area and of width equal to a scanning line, said image resulting in a fully-exposed line due to the scanning mechanisms employed, and a lower part 41 which comprises the light valve proper and controls the amount of exposure of film in accordance with the actuating signal. As shown, the lens 42 images the apertures 40 and 41 one above the other at 44 and 45 on the surface of the film 43. It is clear that any suitable type of recorder, either of the light-controlled or light-producing type, may be arranged (in a combination of two elements if necessary) in the form illustrated to produce the desired result.

Figure 11:
Figure 11 shows the unit area exposure due to the apparatus of Figure 10.

Figure 11 shows the exposure of an area of the film 43 due to the arrangement of Figure 10: the area 45 being exposed to correspond with the received signal and the area 44 having a constant intensity of exposure to render the area opaque.

Figure 12:
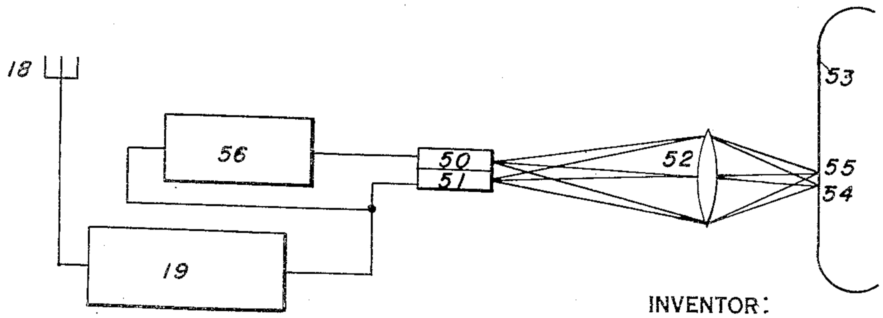
Figure 12 shows another manner of preparing a film of the type shown in Figure 8.

Figure 12 shows means for producing the final resulting film (right hand film of Figure 9) from the received signals without multiple printing processes. In this arrangement the signals picked up by the antenna 18 and amplified etc. by the receiver 19 are passed to a dual light-valve arrangement 50, 51. This unit (which may be a dual light-producing source) consists of two separate elements, each responsive to incoming signals. As shown, the unit 51 receives signals directly from the receiver and the unit 50 is operable by signals from the receiver after passage through the delay network 56. The two valves 50 and 51 may be imaged by the lens 52 at 54 and 55 on the surface of the traveling film 53. Since the image 55 of unit 51 is reproducing the signals of actual scansion at the moment it is clear that the exposure of 54 should be that of the corresponding portion of the preceding frame: this means that the delay network 56 must be such as to delay signals from the receiver 19 by a time equal to the time of travel of one-frame-interval-minus-one-line. In this way the complete picture is built up at one time. This is an electrical equivalent of the mechanical delay present in the multiple-printing method above described.

In Figures 10 and 12 the methods of film movement, transverse scanning, etc. have not been illustrated, it being understood that any suitable methods, for example those shown in Figure 1, may be used.

Where in the specification and appended claims I have refered to motion picture film it is to be understood that reference is made to all types of such films, whether of standard or non-standard sizes and dimensions, and having any desired emulsion characteristics, chromatic or otherwise, including color film. And where I have referred to a light valve or modulating unit I include all types of such devices capable of use for the purposes described. And I intend that my invention shall be applicable to any system employing any suitable type of scanning, framing, traverse scanning, synchronizing, phasing etc. mechanisms. And where I speak of the lines of resolution, I mean the total number of lines into which the original film would be divided if all lines were transmitted: that is the total number of lines which appears on the final film facsimile result after all processes, printings etc. have been completed.

Having now described my invention and illustrated certain preferred embodiments thereof by way of example, I claim:

1. In a system for transmitting facsimiles of motion picture film the method of operation which comprises scanning only even lines in one frame of film and odd lines in the next frame, constituting the scansion of alternate lines of a predetermined odd whole number of lines of resolution per frame interval, transmitting signals in accordance with said scansion, receiving said signals and combining the alternate scanned lines of adjacent frames in pairs to reconstruct a facsimile of the original in accordance with the received signals.

2. In a system for transmitting motion picture film facsimiles those steps in the art which comprises scanning alternate lines of a predetermined odd whole number of lines of resolution per frame interval of the motion picture film thereby producing signals corresponding to the even lines of one frame and the odd lines of the next frame, transmitting and receiving said signals, recording tone values on a film strip in accordance with said received signals, and reproducing a facsimile of the original film by double printing of alternate frames of the recorded film combining alternate scanned lines of adjacent frames.

3. In a facsimile system adapted for the transmission of motion picture film the method which comprises scanning alternate lines of resolution on alternate frames of film so that corresponding portions of adjacent frames are not scanned, transmitting signals representing said scansion, receiving said signals, recording tone values corresponding to said signals on a motion picture film, preparing a photographic negative from said received film, and preparing a print from said negative by a double printing process wherein the register is displaced one frame interval between the successive printings.

4. In a film facsimile system in which an original film is to be transmitted the method of transmission which comprises scanning one-half of the detail of the first frame followed by one-half of the detail of the second frame in such a manner that the portion of the second frame transmitted corresponds to the untransmitted portion of the first frame, subsequently transmitting one-half of the detail of the third frame, the portion of the third frame transmitted corresponding to the untransmitted portion of the second frame, and continuing this sequence to the end of the film; transmitting signals corresponding to said scansion and receiving said signals; recording said received signals and recreating a composite film the first frame of which is compounded of the transmitted portions of the first and second frames of the original film, and the second frame of the composite film is compounded of the transmitted portions of the second and third frames of the original film and the third frame of the composite film is compounded of the transmitted portions of the third and fourth frames of the original film and the sequence is carried on to the end of the film.

MAYNARD D. McFARLANE.

REFERENCES CITED

The following references are of record in the file of this patent:

UNITED STATES PATENTS

| Number | Name | Date |
|---|---|---|
| Re. 17,330 | Williams | June 18, 1929 |
| 1,963,438 | Greensfelder | June 19, 1934 |
| 1,982,211 | Gillette | Nov. 27, 1934 |
| 1,988,931 | Alexanderson | Jan. 22, 1935 |
| 1,992,009 | Kell | Feb. 19, 1935 |
| 2,018,873 | Ramsey | Oct. 29, 1935 |
| 2,029,395 | Smith | Feb. 4, 1936 |
| 2,050,463 | Ramsey | Aug. 11, 1936 |
| 2,163,539 | Clothier | June 20, 1939 |
| 2,177,365 | Goldmark | Oct. 24, 1939 |
| 2,209,747 | Eisler | July 30, 1940 |
| 2,251,786 | Epstein | Aug. 5, 1941 |
| 2,301,199 | Bruce | Nov. 10, 1942 |
| 2,301,254 | Carnahan | Nov. 10, 1942 |
| 2,329,624 | Kellogg | Sept. 14, 1943 |
| 2,337,327 | Haskins | Dec. 21, 1943 |
| 2,401,271 | Pi Suner | May 28, 1946 |

FOREIGN PATENTS

| Number | Country | Date |
|---|---|---|
| 587,772 | Great Britain | May 6, 1947 |

OTHER REFERENCES

Prin. of Tel. Eng., by Fink; McGraw-Hill Book Co. (pages 450–462).